United States Patent [19]

Wragg et al.

[11] 3,899,378

[45] Aug. 12, 1975

[54] METHOD OF PRODUCING RUBBER-PLASTICS COMPOSITES

[75] Inventors: Reginald Trevor Wragg, Tamworth; James Frank Yardley, Shenston, near Lichfield, both of England

[73] Assignee: Dunlop Limited, London, England

[22] Filed: Mar. 5, 1974

[21] Appl. No.: 448,266

[30] Foreign Application Priority Data

Mar. 9, 1973 United Kingdom............... 11591/73

[52] U.S. Cl. ............... 156/73.5; 29/470.3; 156/306; 228/2; 264/68
[51] Int. Cl.² ......................................... B32B 31/20
[58] Field of Search ............... 156/73, 306; 264/68; 29/470.3; 228/2

[56] References Cited

UNITED STATES PATENTS

| | | | |
|---|---|---|---|
| 3,444,018 | 5/1969 | Hewitt | 264/68 |
| 3,468,732 | 9/1969 | Hewitt | 264/68 |
| 3,519,507 | 7/1970 | Pierson | 156/73 |

*Primary Examiner*—Edward G. Whitby
*Attorney, Agent, or Firm*—Stevens, Davis, Miller & Mosher

[57] ABSTRACT

A rubber-plastics composite is made by friction welding a thermoplastic component to a compatible vulcanized rubber component. The method has advantages and uses in applications where rubber-plastics bonds are required, of which the following is a Specification.

12 Claims, No Drawings

METHOD OF PRODUCING RUBBER-PLASTICS COMPOSITES

This invention relates to rubber-plastics composites.

Various methods of producing rubber-plastics composites have been proposed. For instance, it has been proposed to bond a rubber component to a plastics component by means of an adhesive composition but this is a messy and time-consuming method and the adhesive composition must be selected depending on the particular rubber and plastics to be bonded. Also, the adhesive coating may become contaminated by the environment and suffer a consequent loss of efficiency. It has also been proposed to bond selected rubbers and plastics together by fusion bonding, that is, by melting at least one of the components and allowing the fused component to solidify in contact with the other component. This method necessitates maintaining at least one of the components at a high temperature until the components are in the position for bonding and sometimes confers difficulties of accurate and neat location when only part of the surface of the plastics or rubber component is to be bonded. Fusion bonding by injection or compression moulding of fused plastics necessitates uniform high temperature heating, a high pressure and, often, removal of "flash" resulting from spewing of the fused material.

It has also been proposed to achieve fusion bonding of plastics components to each other by assembling the components in contact with each other and heating the assembly at the position of the desired bond by means of a friction tool applied directly to at least one of the components or applied to an intermediary material positioned between the tool and the components. This method has the disadvantages that the tool tends to abrade the surface to which it is applied and it has limited application since the heat of friction must be transmitted through at least one of the components.

We have found that a rubber-plastics composite may be produced in an unpredictably advantageous manner by relative movement of a thermoplastic plastics component in friction contact with a compatible vulcanized rubber component until the friction surface of the plastics component, i.e. the surface in contact with the rubber component, melts and then cooling the molten surface to solidify it in contact with the rubber. It has already been proposed to bond two metals or two thermoplastic plastics components together by this method. This method would be expected to produce a bond between two such similar components in view of their similar physical characteristics. However, the production of a bond between dissimilar materials by this method, particularly between such dissimilar materials as thermoplastic plastics and vulcanized rubber, cannot be predicted.

We have found that, in accordance with this invention, rubber-plastics composites can be made which have a much greater bond strength that can be achieved by heat fusion bonding, for instance polyformaldehyde - polyepichlorhydrin rubber composites and nylon 12 - nitrile rubber composites in which the nitrile rubber surface has not been pre-treated, e.g. with hypochlorite or radiation, to make it more susceptible to bonding. Also, owing to the self-lubricating effect of the molten plastics surface during bonding, the components can be accurately positioned prior to completion of the bond. We have also found that delicate plastics components can be bonded to rubber by this method without damage. Further advantages of this invention are that the apparatus required and method of operation are simple; contamination of the surfaces to be bonded is avoided owing to the plastics surface continually being renewed when molten; no external heat is required; no high pressure is required; a friction time of only a few seconds is usually required; and the method may be used to bond plastics and rubber components which are pre-formed in complex and accurate shapes without damage. Also, we have found that, surprisingly, rubber-plastics composites having improved bond strength may be made in some cases by pre-treating the plastics surface with, for example, acidified sodium hypochlorite solution; this is unexpected since the treated plastics surface becomes molten and is continually renewed during the bonding method.

The relative movement between the plastics and rubber components may be produced in any convenient manner. One or both components may be moved. The friction may be achieved by rotary, angular or linear movement. Angular or linear friction welding is useful for making hollow composites. The movement may be continuous, i.e. in one direction, or oscillatory. If desired, the components may be contra-moved. The components may, if desired, be mounted in a lathe, and an air-drive is often advantageous since this can be stopped quickly when desired. An alternative to mechanical movement of one or both of the components is the use of an ultrasonic frequency welding technique which creates rapid small vibratory movement between the surfaces.

The conditions of the relative movement, such as speed and duration of the movement and pressure between the components, are such as to melt the friction surface of the plastics component. Usually, a time of only a few seconds, e.g. from 1 to 10 seconds, and a pressure of only about 100 to 500 kN/m$^2$, are required. Examples of suitable continuous relative rotary movement speeds are from 750 to 3000 revolutions per minute. When an oscillatory movement is employed, this may be performed over a few degrees of arc or, in the case of linear movement, over about 0.1–6 mm, preferably 1–4 mm, and at a frequency of 50–200 Hz, especially 100 Hz. External heating is not necessary but may be employed if desired.

When a delicate rubber or plastics component is to be bonded, this may be hardened by freezing, e.g. in liquid nitrogen or dry-ice/acetone, prior to the subjection to friction.

When the plastics surface has melted, the components can be accurately positioned, the relative movement stopped and the assembly cooled to solidify the plastics surface. Preferably the relative movement is stopped quickly in order to avoid stress. When the movement is rotary the relative movement may be stopped by releasing the stationary or slower moving component to allow it to speed up to match the speed of the faster moving component and then both components may be slowed down in unison. Preferably a slight pressure across the bond is maintained while the plastics surface solidifies.

The vulcanized rubber and thermoplastic plastics surfaces should be of compatible materials and preferably the melting point of the plastics surface should be below the temperature at which the rubber degrades. Examples of compatible thermoplastic plastics and vulcanized rubbers which may be bonded in accordance with this invention are as follows:

| Plastics | Rubber |
|---|---|
| Substantially linear crystalline low pressure solution olefin polymers, for example, high density polyethylene, polypropylene, and copolymers of ethylene or propylene with each other or with minor amounts of butene-1, hexene-1, or a diene monomer such as butadiene. Thermoplastic high-pressure polymerised ethylene, for example, low density polyethylene or crystalline copolymers of ethylene with vinyl alkanoic esters e.g. vinyl acetate, alkyl acrylates e.g. ethyl acrylate, and vinyl halides e.g. vinyl chloride. Poly(ethylene terephthalate). Poly(tetramethylene terephthalate). | Ethylene/alpha-mono-olefin copolymer or ethylene/alpha-mono-olefin/diolefin terpolymer compositions containing up to 70% polymer. Ethylene/alpha-mono-olefin copolymer or ethylene/alpha-mono-olefin/diolefin terpolymer composition containing up to 55% polymer. Polyepichlorohydrin. Styrene/butadiene. Nitrile. Polybutadiene. Epichlorhydrin/ethyleneoxide. |
| Polar elastoplastic linear block copolymers containing polyester blocks and polyether blocks such as copolymers available under the trade name HYTREL. | Polyepichlorhydrin. Epichlorhydrin/ ethylene oxide. Natural. Styrene/butadiene. Nitrile. Polyurethane. Acrylate. Polychloroprene. Propyleneoxide/ Unsaturated epoxide. Polybutadiene. |
| Polyamide, particularly those having from 3 to 12 methylene groups between the amide groups, e.g. nylon 4 to nylon 13. | Polyepichlorhydrin. Sulphur-cured polyurethane. Nitrile. Vinylidene flouride fluoro-elastomer. Natural. Polychloroprene. Trans-polypentenamer. Styrene/butadiene. Polybutadiene. |
| Polycarbonates, preferably polyesters of carbonic acid which are derived from dihydroxyl compounds in which the hydroxyl groups are directly attached to aromatic rings. | Nitrile. Polyepichlorhydrin. Polybutadiene. |
| Vinyl chloride polymers, e.g. poly(vinyl chloride), poly-(vinyldichloride) and poly-(vinylidene chloride). | Nitrile. |
| Poly(vinylidene fluoride). Styrene-acrylonitrile copolymers. Perspex (methylmethacrylate resin). | Acrylate. Nitrile. Polyepichlorhydrin. Nitrile. |
| Poly(chlorotrifluoroethylene) Polyurethane. | Styrene/butadiene. Styrene/butadiene. Natural. |
| Polyformaldehyde. | Polyepichlorhydrin. Epichlorhydrin/ ethylene-oxide. |

The vinylidene fluoride fluoro-elastomer is a copolymer of vinylidene fluoride with one or more other fluoro-olefines such as chlorotrifluoroethylene, hexafluoropropene, tetrafluoroethylene, dichlorodifluoroethylene, chlorofluoroethylene, fluorinated vinyl esters, fluoro-acrylic acid derivatives, fluorinated alkylvinylethers (e.g. perfluorovinyl perfluoroalkyl ether) and 1,2,3,3,3-pentafluoropropene. Examples of suitable copolymers are those available under the trade names VITON A, VITON B, VITON E60C, FLUOREL and TECNOFLON.

The rubber and/or plastics may be in a compound with the usual ingredients such as fillers, pigments, anti-aging agents, stabilising agents and plasticizers.

We have found that in order to achieve or improve the bond between certain vulcanized rubber and thermoplastic plastics components it is necessary to pretreat the surface of at least one of them, especially when the rubber is a vulcanizate of a hydrocarbon polymer having at least one double bond for each six main chain carbon atoms. The rubber surface is usually treated but in some cases it is possible to obtain an improved bond by treating the plastics surface, for example by treating a nylon surface with acidified sodium hypochlorite solution prior to bonding to a styrene/butadiene rubber. It is surprising that pre-treatment of the plastics surface improves bonding since it might reasonably be expected that its effect would be lost during the friction melting.

Suitable pre-treatments include subjecting the surface to chemical treatment using, for example, acidified sodium hypochlorite, concentrated nitric acid, aqueous solution of trichloroisocyanuric acid (Fi-clor 91), sodium dichloroisocyanuric acid (Fi-clor 60S) or a 1 percent wt/vol dioxan solution of 4(p-carboxyphenyl)-1,3,5-triazoline-2,4-dione. The chemical treatment may be performed by any convenient means, for example by dipping, spraying or brushing, and the residue of the chemical reagent should be removed after treatment if its retention would undesirably affect the bond or the composite. Alternative pre-treatments are irradiation such as UV irradiation or glow discharge and flame-treatment. The treatment time should be sufficient to modify the component surface without undesirably degrading the bulk of the component. Examples of pre-treatment times are between 5 seconds and 5 minutes.

A further modification which in some cases gives improved results, particularly when the tear strength of the rubber surface is low or when the rubber is natural rubber, is to apply a lubricant between the friction surfaces prior to the friction movement. This can have the effect of reducing the initial torque, reducing the wearing away of the rubber and, surprisingly, improving the bond strength. Examples of suitable lubricants are silicones, poly(tetrafluoroethylene) and rubber processing oils. We have found that the lubricant is not detrimental to the bond strength since it is generally swept away during the relative movement.

The present invention is not limited to a method of producing composite structures consisting of only two components, i.e. one rubber component and one plastics component. The invention also covers the production of multicomponent structures in which the additional components may be made of rubber and/or plastics and/or metal and may be bonded by the method of the present invention to the plastics or rubber component. Alternatively, additional component or components may be bonded by any convenient method to either the plastics or rubber component prior to or after the plastics and rubber components have been bonded by the method of the present invention.

The present invention may be used to bond two incompatible materials by means of an interposed material which is compatible with the other two materials. For instance, a metal may be indirectly bonded to a rubber component with which it will not bond directly, by means of an interposed plastics component which is bonded to the rubber component in accordance with this invention and is bonded to the metal by any convenient method. Similarly, a rubber component may be friction bonded to a plastics component in accordance with this invention, and the plastics or rubber component may be bonded to another plastics or rubber component by friction bonding or any other convenient method. Examples of assemblies of incompatible materials bonded together via a mutually compatible material in accordance with this invention are nylon-maleinised polypropylene-ethylene/propylene/diene terpolymer and polyformaldehyde-polyepichlorhydrin-nitrile rubber.

The invention is illustrated in the following Examples.

EXAMPLE I

The rubber composition of formulation given below was vulcanized for 60 minutes at 150°C. in a mould measuring 4.0 mm × 76.2 mm × 228.6 mm. A sheet measuring 4.0 mm × 50 mm × 50 mm was cut from the vulcanizate and mounted on the face of a lathe. The face plate was rotated at 1000 revolutions per minute and a stationary 25 mm diameter rod of polypropylene was pressed perpendicularly against the sheet at the centre of rotation under sufficient pressure to melt the surface of the plastic. After 5 seconds the polypropylene rod was released and allowed to rotate freely while attached to the rubber and allowed to cool for 30 seconds. When cold, the polypropylene rod was found to have strongly adhered to the vulcanized rubber, such that rubber failure occurred on stripping.

| Rubber Formulation | Parts by Weight |
| --- | --- |
| EPDM rubber (Royalene 502) | 100.0 |
| Fast extrusion furnace carbon black | 150.0 |
| Sunpar 2280 oil | 100.0 |
| Zinc oxide | 5.0 |
| Zinc dibutyldithiocarbamate | 2.0 |
| 2-Mercaptobenzthiazole | 1.5 |
| Tetramethylthiuram disulphide | 0.5 |
| Sulphur | 2.0 |

EXAMPLE II

Example I was repeated using a rod made from low density polyethylene. Rubber failure was obtained on stripping.

EXAMPLE III

A cylindrical elastomeric component, 30 mm long and 17 mm diameter, was made by vulcanizing the rubber composition of formulation given below, for 60 minutes at 150°C. in a suitable mould. The rubber cylinder was mounted in the chuck of a lathe and bonded at one end to a 17 mm diameter polypropylene rod by the method described in Example I. The polypropylene rod was then cut so that a 2 cm length was retained adhering to the rubber cylinder. The position of the cylinder in the chuck of the lathe was reversed and a length of 17 mm diameter polypropylene rod was bonded to its other end by the method described in Example I. This second rod was subsequently cut to leave a 2 cm length of rod attached to the rubber cylinder. In this way a product comprising a rubber cylinder bonded at both ends to cylinders of polypropylene was obtained. The polypropylene was subsequently shaped to form an anti-vibration mounting.

A 6 mm wide groove was turned in each polypropylene end-piece to facilitate testing on a 10-ton Avery testing machine. The sample was stretched in pure tensile by clamping each polypropylene end-piece and measuring the load at failure point during separation at a rate of 50 mm/minute. Failure occurred in the rubber phase at a force of 3850 kN/m².

| Rubber Formulation | Parts by Weight |
| --- | --- |
| EPDM rubber (Royalene 502) | 100.0 |
| Fast extrusion furnace carbon black | 80.0 |
| Sunpar 2280 oil | 60.0 |
| Zinc oxide | 5.0 |
| Zinc dibutyldithiocarbamate | 2.0 |
| 2-Mercaptobenzthiazole | 1.5 |
| Tetramethylthiuram disulphide | 0.5 |
| Sulphur | 2.0 |

EXAMPLE IV

Example III was repeated except that the plastics components were made from nylon 12 and the vulcanized rubber component was made from the formulation given below by vulcanizing for 40 minutes at a temperature of 150°C. Prior to friction welding, the vulcanized rubber component was dipped in an acidified solution of sodium hypochlorite for 5 minutes.

The formulation of this solution was as follows:

| | |
| --- | --- |
| 12% wt/vol solution of sodium hypochlorite | 30 ml |
| concentrated hydrochloric acid | 10 ml |
| water | 1000 ml |

After friction welding, the composite was tested as described in Example III and found to fail in the rubber phase at a force of 6750 kN/m².

| Rubber Formulation | Parts by Weight |
| --- | --- |
| Styrene-butadiene rubber (Intol 1500) | 100 |
| High abrasion furnace carbon black (N330) | 50 |
| Mineral oil | 5.0 |
| Zinc oxide | 3.0 |
| Sulphur | 1.75 |
| Stearic acid | 1.0 |
| N-cyclohexyl benzthiazyl-2-sulphenamide | 1.0 |
| Nonox ZA (4-isopropylamino-diphenylamine) | 0.15 |
| BLE 25 | 1.25 |

BLE 25 is a high temperature reaction product of diphenylamine and acetone.

EXAMPLE V

Example IV was repeated except that the plastics components were made from nylon 6. Failure occurred in the rubber phase on testing.

EXAMPLE VI

Example III was repeated except that the plastics components were made from nylon 6 and the rubber component was made from the formulation given below by vulcanizing for 40 minutes at 150°C. Prior to friction welding, the vulcanized rubber component was dipped in an acidified sodium hypochlorite solution as described in Example IV. Failure occurred in the rubber phase on testing.

| Rubber Formulation | Parts by Weight |
|---|---|
| Butadiene-acrylonitrile rubber (Butakon A 3003) | 100 |
| High abrasion furnace carbon black (N330) | 50.0 |
| Dialphanol phthalate | 1.0 |
| Stearic acid | 2.0 |
| Zinc oxide | 5.0 |
| N-cyclohexylbenzthiazyl-2-sulphenamide | 1.0 |
| Magnesium carbonate coated sulphur | 1.5 |
| Nonox B (acetone/diphenylamine condensation product) | 1.0 |

"Alphanol" is a trade name and dialphanol phthalate is a plasticizer based on $C_6$–$C_9$ alcohols.

EXAMPLE VII

Example III was repeated except that the plastics components were made from nylon 12 and the rubber component was made from the formulation used in Example VI by vulcanizing for 40 minutes at 150°C. In this Example the vulcanizate was not treated with acidified sodium hypochlorite. Failure occurred in the rubber phase on testing.

EXAMPLE VIII

Example III was repeated except that the plastics components were made from polyformaldehyde available under the trade name Delrin. The rubber component was made from the formulation given below by vulcanizing for 60 minutes at 150°C. The composite failed in the rubber phase at a force of 2450 kN/m².

| Rubber Formulation | Parts by Weight |
|---|---|
| Polyepichlorohydrin (Herclor H) | 100 |
| High abrasion furnace carbon black (N330) | 40 |
| Ethylene thiourea | 1.5 |
| Nickel dibutyl dithiocarbamate | 1.0 |
| Zinc stearate | 1.0 |
| Red lead ($Pb_3O_4$) | 5.0 |

EXAMPLE IX

Example III was repeated except that the plastics components were made from poly(methyl methacrylate) and the rubber component was made from the formulation used in Example VIII by vulcanizing for 60 minutes at 150°C. The composite failed in the rubber phase when tested.

EXAMPLE X

Example III was repeated except that the plastics components were made from polycarbonate and the rubber component was made from the formulation given in Example VI by vulcanizing for 40 minutes at 150°C. The composite failed in the rubber phase when tested.

EXAMPLE XI

Example III was repeated except that the plastics components were made from poly(vinyl chloride) and the rubber component was made from the formulation given in Example VI by vulcanizing for 40 minutes at 150°C. The composite failed in the rubber phase on testing.

EXAMPLE XII

Example III was repeated except that the plastics components were made from poly(ethylene terephthalate) available under the trade name Arnite and the rubber component was made from the formulation given in Example VI by vulcanizing for 40 minutes at 150°C. Prior to friction welding, the vulcanized rubber component was dipped in an acidified sodium hypochlorite solution as described in Example IV. Failure occurred in the rubber phase on testing.

EXAMPLE XIII

A degreased steel "button" heated to 270°C. was dipped very briefly (about 5 seconds) into a fluidised bed of nylon 11 powder containing resorcinol and hexamethylene tetramine and then allowed to cool, whereby the face of the steel "button" became lightly coated with the nylon 11. This nylon-coated steel "button" was mounted in a lathe and rotated at about 1000 revolutions per minute. A rod of cured SBR of the formulation given in Example IV, treated with an acidified solution of sodium hypochlorite as described in Example IV, was pressed against the nylon coating on the steel button for 5 seconds, and then allowed to rotate freely with it, the bond having been formed. By repeating the process, a steel button was joined to the other end of the SBR rod. Upon testing the tensile strength of the composite rod in an Instron testing machine, failure occurred in the rubber phase.

The resorcinol and hexamethylene tetramine were incorporated into the nylon powder as follows: 1 part by weight of resorcinol dissolved in diethylether was thoroughly mixed with 50 parts by weight of nylon powder and the solvent was then removed. 0.5 part by weight of hexamethylene tetramine dissolved in chloroform was thoroughly mixed with another 50 parts by weight of nylon powder and the solvent was then removed. The two portions of nylon powder were then blended together.

EXAMPLE XIV

The rubber composition of formulation given below was vulcanized for 40 minutes at 150°C. in a mould measuring 4.0 mm × 76.2 mm × 228.6 mm. The sheet was dipped for 5 minutes in an acidified hypochlorite solution consisting of:

| | |
|---|---|
| Water | 1000 ml |
| Concentrated hydrochloric acid | 5 ml |
| Sodium hypochlorite solution containing 12% wt/volume of available chlorine | 30 ml |

The sheet was washed in water and allowed to dry. A 12 mm rod of polychlorotrifluoroethylene rotating at 2500 revolutions per minute was pressed onto the sheet with a force of 15 kg for 10 seconds before rotation was stopped. The clamping force was maintained for 30 seconds. When cold, the rod was found to have strongly adhered to the vulcanized rubber.

| Rubber Formulation | Parts by Weight |
|---|---|
| Styrene-butadiene rubber (Intol 1502) | 100 |
| High abrasion furnace carbon black (N330) | 48.75 |
| Mineral oil | 5.0 |

-Continued

| Rubber Formulation | Parts by Weight |
|---|---|
| Zinc oxide | 3.0 |
| Stearic acid | 1.0 |
| Sulphur | 1.75 |
| N-cyclohexyl benzthiazyl-2-sulphenamide | 1.0 |
| Nonox ZA (isopropylamino-diphenylamine) | 0.25 |
| Nonox BLB | 2.5 |

Nonox BLB is a condensation product of acetone and diphenylamine absorbed on carbon black.

EXAMPLE XV

A hollow open-ended right-angled box having internal dimensions of 35 × 25 × 18 mm, a wall thickness of about 2 mm and a flange at the open end (35 × 25) making the effective wall thickness at the open end to be 5 mm, was made up from the hypochlorite-treated vulcanized SBR composition described in Example XIV. This box was clamped in a Mecasonic linear welding machine with its flanged open-end in contact with the flanged open end of a similar hollow box of nylon 12 which was also clamped in the machine. The flanged ends were oscillated in contact for 1 second over an amplitude of 2 mm using a frequency of 100 Hz and a pressure of about 104 kN/m² (15 lb. in.$^{-2}$).

After cooling, a hole was drilled in the resulting closed hollow composite and the composite was filled with air at a pressure of 414 kN/m² (60 lb. in.$^{-2}$) without producing failure.

EXAMPLE XVI

A 3 × 6 × 0.25 cm sheet of rubber or plastics was rotated at 1500 revolutions per minute in a lathe, and a nonrotating flat-ended rod of plastics or rubber fitted in a collet on a time/pressure control device in the lathe was moved approximately perpendicularly with respect to the sheet to contact the sheet centrally. The friction contact was maintained under a slight pressure until the contact surface of the plastics component had melted and then the rotatory power to the sheet was cut off, the brake on the rod released and the components were allowed to rotate in unison. The assembly came to rest in a few seconds and contact was maintained until the plastics surface had solidified. A successful bond was indicated by failure at least partly in the rubber component when subjected to a 90° peel test at a rate of 5 cm. min.$^{-1}$.

This procedure was followed for a variety of rubbers and plastics components.

Good bonds were obtained between the following components under the following conditions. N.B. The pressure values given are those on a 2.54 cm diameter circular area.

| Sheet | Rod | Rod diameter (cm) | Time (secs.) | Pressure (kN/m²) |
|---|---|---|---|---|
| Polybutadiene(T) | HYTREL | 1.27 | 5 | 207 |
| Polybutadiene(T) | Nylon 12 | 1.91 | 5 | 276 |
| Polybutadiene(T) | Nylon 6 | 1.91 | 5 | 276 |
| Polybutadiene(T) | Nylon 6.6 | 1.91 | 5 | 276 |
| Polybutadiene(T)(O) | ARNITE | 2.54 | 8 | 344 |
| Polybutadiene(T)(O) | Polycarbonate | 2.54 | 8 | 344 |
| Natural rubber(T) | HYTREL | 1.27 | 5 | 207 |
| Natural rubber(T) | Nylon 12 | 1.91 | 2 | 276 |
| Natural rubber(T) | Nylon 11 | 1.91 | 2 | 276 |
| PAREL 58 | HYTREL | 1.27 | 5 | 344 |
| SBR(T) | Nylon 6.10 | 1.91 | 2 | 207 |
| Acrylate rubber | HYTREL | 1.27 | 7 | 482 |
| Acrylate rubber | KYNAR | 1.27 | 7 | 482 |
| Trans-poly-pentenamer | HYTREL | 1.27 | 5 | 344 |
| Trans-poly-pentenamer | Nylon 12 | 1.91 | 5 | 344 |
| Epichlorhydrin/ethylene oxide copolymer | DELRIN | 2.54 | 5 | 276 |
| Polyepichlorhydrin | HYTREL | 1.27 | 5 | 207 |
| Polyepichlorhydrin | Nylon 12 | 1.91 | 3 | 344 |
| Polyepichlorhydrin | Nylon 6 | 1.91 | 3 | 344 |
| Polyepichlorhydrin | Polycarbonate | 2.54 | 5 | 276 |
| Polyepichlorhydrin | DELRIN | 2.54 | 5 | 276 |
| Nitrile rubber(T) | Polymethylmethacrylate | 1.27 | 5 | 207 |
| Nitrile rubber(T) | HYTREL | 1.27 | 5 | 207 |
| Nitrile rubber(T) | TENITE | 2.54 | 3 | 207 |
| Nitrile rubber | Nylon 12 | 1.91 | 2 | 207 |
| Styrene/acrylonitrile copolymer | Nitrile rubber | 1.91 | 3 | 207 |
| Polychloroprene | HYTREL | 1.27 | 5 | 344 |
| Polychloroprene(T) | Nylon 12 | 1.91 | 5 | 344 |
| Polychloroprene(T) | Nylon 6 | 1.91 | 5 | 344 |
| ADIPRENE | Nylon 12 | 1.91 | 5 | 207 |
| VITON B | Nylon 12 | 1.91 | 7 | 344 |
| VITON B | Nylon 6.6 | 1.91 | 9 | 482 |
| SBR | Nylon 12(X) | 1.91 | 1 | 276 |

T = component surface was pre-treated prior to friction contact, by immersing the surface for about 1 minute in a freshly made acidified sodium hypochlorite solution described in Example IV, followed by rinsing in water and drying.

O = a thin film of an aromatic oil lubricant available under the trade name Dutrex R was smeared on the component surface prior to friction contact.

X = component surface was pre-treated prior to friction contact by immersing the surface for about 4 minutes in a freshly made acidified sodium hypochlorite solution described in Example IV, followed by rinsing in water and drying.

| | |
|---|---|
| ADIPRENE | = trade name of a polyurethane rubber. |
| ARNITE | = trade name of poly(ethylene terephthalate). |
| DELRIN | = trade name of polyformaldehyde. |
| HYTREL | = trade name of an elastoplastic linear block having polyester blocks and polyether blocks. |
| KYNAR | = trade name of poly(vinylidene fluoride). |
| PAREL 58 | = trade name of propyleneoxide/allyl-glycidylether copolymer. |
| TENITE | = trade name of poly(tetramethylene terephthalate). |
| VITON B | = trade name of a vinylidene fluoride copolymer. |

The natural rubber - nylon 12 bond strength was improved when the hypochlorite-treated rubber surface was smeared with Dutrex R.

A bond was produced between polybutadiene rubber and ARNITE without oil lubricant but with the hypochlorite pretreatment, but this was not as strong as when the oil lubricant was used.

The rubber components had the following formulations:

| | Parts by Weight |
|---|---|
| Polybutadiene (Shell Cariflex BR 1220) | 100.0 |
| Sulphur | 1.75 |
| N-cyclohexyl benzthiazyl-2-sulphenamide | 0.8 |
| Stearic acid | 2.0 |
| Zinc oxide | 3.0 |
| Processing oil (Sundex 790) | 15.0 |
| Nonox ZA (4-isopropylamino-diphenylamine) | 0.25 |
| Nonox BLB | 2.5 |
| N330 carbon black | 58.75 |

Nonox BLB is an acetone/diphenylamine reaction product absorbed on carbon black.

The compound was cured at 135°C. for 50 minutes after a 15 minute heating up period.

| | |
|---|---|
| Natural rubber (SMR 10) | 100.0 |
| Sulphur | 2.5 |
| N-cyclohexyl benzthiazyl-2-sulphenamide | 0.5 |
| Stearic acid | 2.0 |
| Zinc oxide | 5.0 |
| Mineral oil (38/A) | 5.0 |
| Nonox ZA | 0.15 |
| Nonox BLB | 1.7 |
| N330 carbon black | 49.15 |

The compound was cured at 135°C. for 50 minutes after a 15 minute heating up period.

| | |
|---|---|
| PAREL 58 | 100.0 |
| High abrasion furnace carbon black | 50.0 |
| Zinc oxide | 5.0 |
| Stearic acid | 1.0 |
| Sulphur | 1.25 |
| Nickel dibutyl dithiocarbamate | 1.0 |
| Tetramethylthiuram monosulphide | 1.5 |
| Mercaptobenzthiazole | 1.5 |

The compound was cured at 160°C. for 35 minutes after a 15 minute heating up period.

The SBR vulcanizate was prepared as described in Example XIV.

| | |
|---|---|
| Acrylate rubber (Hycar 5021) | 100.0 |
| High abrasion furnace carbon black | 50.0 |
| Stearic acid | 1.0 |
| Dibasic lead diphosphite (Diphos) | 5.0 |
| Hexamethylenediamine carbamate (Diak 1) | 1.0 |
| Polymerised trimethyl dihydroquinoline (Flectol H) | 1.5 |

The compound was cured at 150°C. for 60 minutes after a 15 minute heating up period.

| | |
|---|---|
| Trans-polypentenamer | 100.0 |
| N330 carbon black | 75.0 |
| Processing oil (Circosol 4240) | 45.0 |
| Zinc oxide | 5.0 |
| Stearic acid | 1.5 |
| Sulphur | 2.0 |
| N-cyclohexyl benzthiazyl-2-sulphenamide | 1.0 |
| Nonox ZA | 0.25 |
| Nonox BLB | 2.5 |

The compound was cured at 150°C. for 40 minutes after a 15 minute heating up period.

| | |
|---|---|
| Epichlorhydrin/ethylene oxide copolymer (Herclor C) | 100.0 |
| High abrasion furnace carbon black | 40.0 |
| Ethylene thiourea | 1.5 |
| Nickel dibutyl dithiocarbamate | 1.0 |
| Zinc stearate | 1.0 |
| Red lead | 5.0 |

The compound was cured at 150°C. for 60 minutes after a 15 minute heating up period.

The polyepichlorhydrin vulcanizate was prepared as described in Example VIII.

The nitrile rubber vulcanizate was prepared as described in Example VI.

| | |
|---|---|
| Polychloroprene (Neoprene WRT) | 100.0 |
| Sulphur | 0.5 |
| Tetramethylthiuram disulphide | 0.5 |
| Diphenyl guanidine | 0.5 |
| Zinc oxide | 5.0 |
| Stearic acid | 1.0 |
| Octamine | 1.0 |
| N330 carbon black | 35.0 |
| Permalux | 1.0 |
| Light calcined magnesia | 4.0 |

Octamine is the trade name of a diphenylamine/diisobutylene reaction product and Permalux is the trade name of the di-ortho-tolylguanidine salt of dicatechol borate.

The compound was cured at 150°C. for 40 minutes after a 15 minute heating up period.

| Adiprene CM | 100.0 |
|---|---|
| High abrasion furnace carbon black | 50.0 |
| Coumarone indene resin | 15.0 |
| Dibenzthiazyl disulphide | 4.0 |
| Mercaptobenzthiazole | 1.0 |
| Sulphur | 0.75 |
| Caytur 4 | 0.35 |
| Cadmium stearate | 0.5 |

Caytur 4 is a zinc chloride/dibenzthiazyl disulphide complex.

The compound was cured at 140°C. for 60 minutes after a 15 minute heating up period.

| Viton B | 100.0 |
|---|---|
| Magnesia | 15.0 |
| Medium thermal carbon black | 20.0 |
| Diak 3 (N,N'-dicinnamylidene-1,6-hexanediamine) | 3.0 |

The compound was press-cured at 149°C. for 30 minutes, followed by heating in an oven at 205°C. for 24 hours.

Having now described our invention, what we claim is:

1. A method of producing a rubber-plastics composite
   by relative movement of a thermoplastic plastics component in friction contact
   with a compatible vulcanized rubber component until the plastics surface in contact with the rubber component melts, and
   then allowing the plastics surface to solidify in contact with the rubber component, said compatible plastics and rubber components selected from the group consisting of substantially linear crystalline low pressure solution olefin polymers with ethylene/alpha-mono-olefin copolymer or ethylene/alpha-mono-olefin/diolefin terpolymer compositions containing up to 70 percent polymer; low density polyethylene or a crystalline copolymer of ethylene with a vinyl alkanoic ester, an alkyl acrylate or a vinyl halide, with ethylene/alpha-mono-olefin copolymer or ethylene/alpha-mono-olefin/diolefin terpolymer compositions containing up to 55 percent polymer; poly(ethylene terephthalate) or poly(tetramethylene terephthalate) with polyepichlorhydrin, styrene/butadiene rubber, nitrile rubber, polybutadiene rubber or epichlorhydrin/ethylene oxide rubber; polar elastoplastic linear block copolymers containing polyester blocks and polyether blocks with polyepichlorhydrin, epichlorhydrin/ethylene oxide rubber, natural rubber, styrene/butadiene rubber, nitrile rubber, polyurethane rubber, acrylate rubber, polychloroprene, propylene oxide/unsaturated epoxide rubber or polybutadiene rubber; polyamides with polyepichlorhydrin, sulphur-cured polyurethane, nitrile rubber, vinylidene fluoride fluoro-elastomer, natural rubber, polychloroprene, trans-polypentenamer, styrene/butadiene rubber or polybutadiene rubber; polycarbonates with nitrile rubber, polyepichlorhydrin or polybutadiene rubber; vinyl chloride polymers with nitrile rubber; poly(vinylidene fluoride) with acrylate rubber; styrene/acrylonitrile copolymer with nitrile rubber; methyl methacrylate resin with polyepichlorhydrin or nitrile rubber; poly(chlorotrifluoroethylene) with stryene/butadiene rubber; polyurethane plastics with styrene/butadiene rubber or natural rubber; and polyformaldehyde with polyepichlorhydrin or epichlorhydrin/ethylene oxide rubber.

2. Method according to claim 1 wherein the relative movement is selected from the group consisting of rotary, angular and linear mechanical movement.

3. Method according to claim 1 wherein the melting point of the plastics component is below the temperature at which the rubber degrades.

4. Method according to claim 1 wherein the component surfaces are relatively moved in contact for from 1 to 10 seconds and the pressure between the surfaces during the relative movement is from 100 to 500 $kN/m^2$.

5. Method according to claim 1 wherein the relative movement is continuous rotary movement at from 650 to 3000 revolutions per minute.

6. Method according to claim 1 wherein the relative movement is oscillatory linear movement at a frequency of from 50 to 200 Hz.

7. Method according to claim 1 wherein at least one of the components is frozen to harden it for the relative movement.

8. Method according to claim 1 wherein a lubricant is applied between the component surfaces to be bonded.

9. Method according to claim 1 wherein the substantially linear crystalline low pressure solution olefin polymer is selected from the group consisting of high density polyethylene, polypropylene and copolymers of ethylene or propylene with each other or with a minor amount of butene-1, hexene-1 or a diene such as butadiene, the vinyl alkanoic ester is vinyl acetate, the alkyl acrylate is ethyl acrylate, the vinyl halide of the ethylene copolymer is vinyl chloride, the polyamide has from 3 to 12 methylene groups between the amide groups, the polycarbonate is a polyester of carbonic acid which is derived from dihydroxyl compounds in which the hydroxyl groups are directly attached to aromatic rings, and the vinyl chloride polymer is selected from the group consisting of poly(vinyl chloride), poly(vinyl dichloride) and poly(vinylidene chloride).

10. Method according to claim 1 wherein the rubber component surface to be bonded is pre-treated by a treatment selected from the group consisting of acidified sodium hypochlorite, concentrated nitric acid, aqueous solution of trichloroisocyanuric acid, sodium dichloroisocyanuric acid, 4(p-carboxyphenyl-1,3,5-triazoline-2,4-dione solution, UV irradiation, glow discharge and flame-treatment.

11. Method according to claim 1 wherein the plastics component surface to be bonded is pre-treated with an agent selected from the group consisting of acidified sodium hypochlorite, aqueous solution of trichloroisocyanuric acid and sodium dichloroisocyanuric acid.

12. The method according to claim 8 wherein said lubricant is selected from the group consisting of a silicone, poly(tetrafluoroethylene) and a rubber processing oil.

* * * * *